US004001608B2

United States Statutory Invention Registration [19]

[11] Reg. Number: H1608

Nishio et al.

[45] Published: Nov. 5, 1996

[54] METHOD OF PROCESSING SILVER HALIDE PHOTOGRAPHIC LIGHT-SENSITIVE MATERIAL

[75] Inventors: Shoji Nishio; Hideki Komatsu, both of Hino, Japan

[73] Assignee: Konica Corp., Tokyo, Japan

[21] Appl. No.: 313,358

[22] Filed: Sep. 27, 1994

[30] Foreign Application Priority Data

Oct. 6, 1993 [JP] Japan ..... 5-250709

[51] Int. Cl.[6] ..... G03C 1/06

[52] U.S. Cl. ..... 430/264; 430/265; 430/267; 430/268; 430/434; 430/399; 430/448; 430/491; 430/492

[58] Field of Search ..... 430/264, 265, 430/267, 268, 363, 434, 448, 491, 492, 399

[56] References Cited

U.S. PATENT DOCUMENTS

| | | | |
|---|---|---|---|
| 5,066,569 | 11/1991 | Nagashima et al. | 430/393 |
| 5,232,823 | 8/1993 | Morimoto et al. | 430/438 |
| 5,352,563 | 10/1994 | Kawasaki et al. | 430/264 |
| 5,384,232 | 1/1995 | Bishop et al. | 430/440 |

FOREIGN PATENT DOCUMENTS

| | | |
|---|---|---|
| 146302 | 6/1985 | European Pat. Off. . |
| 316864 | 5/1989 | European Pat. Off. . |
| 504838 | 9/1992 | European Pat. Off. . |
| 554000 | 8/1993 | European Pat. Off. . |

OTHER PUBLICATIONS

Derwent, No. 84–129,452 JPA–58–174,948; Oct. 14, 1983.

*Primary Examiner*—Harvey E. Behrend
*Assistant Examiner*—John R. Hardee
*Attorney, Agent, or Firm*—Bierman and Muserlian

[57] ABSTRACT

A method of processing with a developer a silver halide photographic light-sensitive material is disclosed, the material comprising a support and provided thereon, a silver halide emulsion layer comprising silver halide grains having not less than 90 mol % chloride, the emulsion layer or a hydrophilic colloid layer adjacent to the emulsion layer containing a tetrazolium compound, or a hydrazine derivative, and replenisher for developer being supplied to the developer in an amount of not more than 200 ml per $m^2$ of the material processed, wherein the developer contains a carbonate salt in an amount of not less than 0.2 mol/liter.

8 Claims, No Drawings

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

METHOD OF PROCESSING SILVER HALIDE PHOTOGRAPHIC LIGHT-SENSITIVE MATERIAL

FIELD OF THE INVENTION

The invention relates to a method of processing a high contrast silver halide photographic light-sensitive material, and particularly to a method of processing a high contrast silver halide photographic light-sensitive material with less replenishing.

BACKGROUND OF THE INVENTION

The photomechanical film-making process comprises a process of converting a half-tone image to a dot image. In this process the technique according to an infectious development has been used for reproduction of a high contrast image. An image of high contrast and high resolution can be obtained by processing a lith type silver halide photographic light-sensitive material with an alkaline hydroquinone developer having a low concentration of a sulfite ion, so-called, a lith type infectious developer.

However, such a lith type infectious developer has problems that it is likely to subject to an air oxidation and its extremely poor preservability makes it difficult to keep constant a quality of continuously processed photographic light-sensitive materials.

As a method of obtaining a high contrast image rapidly without using such a developer, there is proposed a method of developing a silver halide photographic light-sensitive material comprising a tetrazolium compound or a hydrazine derivative, so-called, a contrast increasing agent, with an alkaline developer. According to this method, the preservability of the developer is excellent, rapid processing is possible, and an ultra high contrast image can be easily obtained.

However, in the method of processing a silver halide photographic light-sensitive material comprising a contrast increasing agent, the preservability of the developer is improved, but the developer has problems that sensitivity variation is increased and image sharpness is deteriorated on processing the material with less replenishment. The resolution of the problems has been required.

The demand for less replenishing of developer has been recently increased in view of resources saving and environmental protection. Under such a background, a method capable of stably processing a silver halide photographic light-sensitive material even with less replenishment of developer.

SUMMARY OF THE INVENTION

An object of the invention is to provide a method of processing a silver halide photographic light-sensitive material with less replenishment wherein photographic properties thereof are less deteriorated.

DETAILED DESCRIPTION OF THE INVENTION

The above object of the invention can be attained by a method of processing a silver halide photographic light-sensitive material comprising a support and provided thereon, a silver halide emulsion layer comprising silver halide grains having not less than 90 mol % chloride, the emulsion layer or a hydrophilic colloid layer adjacent to the emulsion layer containing a tetrazolium compound or a hydrazine derivative, and replenisher for developer being supplied to the developer in an amount of not more than 200 ml per $m^2$ of the material, wherein the developer contains a carbonate salt in an amount of not less than 0.2 mol/liter.

It is preferable that the developer contains not less than $1.6\times10^{-2}$ mol/liter of boric acid or a borate or has not less than 0.2 of a ratio of a potassium ion to a sodium ion. It is more preferable that the developer contains not less than $1.6\times10^{-2}$ mol/liter of boric acid or a borate and has not less than 0.2 of a ratio of a potassium ion to a sodium ion.

The hydrophilic colloid layer of the invention which is adjacent to the silver halide emulsion layer refers to an intermediate layer, an antihalation layer or a protective layer, each containing no silver halide grains, or another emulsion layer containing silver halide grains.

The invention will be concretely explained below.

In the invention the hydrazine derivative is contained in at least one hydrophilic colloid layer on the silver halide emulsion layer side, and may be contained in the different two layers. It is especially preferable that it is contained in the silver halide emulsion layer and/or at least one hydrophilic colloid layer adjacent to the emulsion layer.

Next, the hydrazine derivative used in the invention is represented by the following Formula [H].

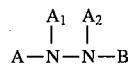

Formula [H]

The Formula [H] will be detailed below.

A represents a substituted or unsubstituted aliphatic, aryl or heterocyclic group.

The aliphatic group represented by A is preferably a group having 1 to 30 carbon atoms, and more preferably a straight-chained, branched or cyclic alkyl group having 1 to 20 carbon atoms. The examples thereof include a methyl, ethyl, t-butyl, octyl, cyclohexyl and benzyl group, each of which may have a substituent such as an aryl, alkoxy, aryloxy, alkylthio, arylthio, sulfoxy, sulfonamide, acylamino, or ureido group.

The aryl group represented by A in Formula [H] is preferably a single or condensed ring group, for example, a benzene ring group or a naphthalene ring group.

The heterocyclic group represented by A in Formula [H] is preferably a single or condensed ring group containing a hetercycle having one hetero atom selected from a nitrogen, sulfur and oxygen atom, such as a pyrrolidine ring, an imidazole ring, a tetrahydrofuran ring, a morpholine ring, a pyridine ring, a pyrimidine ring, a quinoline ring, a thiazole ring, a benzothiazole ring, a thiophene ring or a furan ring.

The group represented by A preferably represents an aryl group or a heterocyclic group. The aryl or heterocyclic group may have a substituent. The examples of the substituent include an alkyl group (preferably having 1 to 20 carbon atoms), an aralkyl group (preferably a single or condensed ring group having an alkyl group of 1 to 3 carbon atoms), an alkoxy group (preferably having an alkyl group of 1 to 20 carbon atoms), a substituted amino group (preferably having an alkyl group or alkylidene group of 1 to 20 carbon atoms), an acylamino group (preferably having 1 to 40 carbon atoms), a sulfonamide group (preferably having 1 to 40 carbon atoms), a ureido group (preferably having 1 to 40 carbon atoms), a hydrazinocarbonylamino group (preferably having 1 to 40 carbon atoms), a hydroxy group or a phosphoamide group (preferably having 1 to 40 carbon atoms).

The group represented by A preferably has at least one of a non-diffusible group and a group for promoting silver halide adsorption. The non-diffusible group is preferably a ballast group which is conventionally used in immobile photographic additives such as couplers, and the ballast group includes an alkyl, alkenyl, alkinyl or alkoxy group having not less than 8 carbon atoms or a phenyl, phenoxy or alkylphenoxy group, which is relatively inactive to photographic properties. The group for promoting silver halide adsorption includes a thiourea, thiourethane, mercapto, thioether, thion, heterocyclic, thioamidoheterocyclic or mercaptoheterocyclic group or an adsorption group described in column 12, line 19 to column 18, line 7 of Japanese Patent O.P.I. Publication No. 64-90439/1989.

The example of B includes an acyl group (for example, formyl, acetyl, propionyl, trifluoroacetyl, methoxyacetyl, phenoxyacetyl, methylthioacetyl, chloroacetyl, benzoyl, 2-hydroxymethylbenzoyl, 4-chlorobenzoyl), an alkylsulfonyl group (for example, methanesulfonyl, chloroethanesulfonyl), an arylsulfonyl group (for example, benzenesulfonyl), an alkylsulfinyl group (for example, methanesulfinyl), an arylsulfinyl group (for example, benzenesulfinyl), a carbamoyl group (for example, methytcarbamoyl, phenylcarbamoyl), an alkoxycarbonyl group (for example, methoxycarbonyl, methoxyethoxycarbonyl), an aryloxycarbonyl group (for example, phenyloxycarbonyl), a sulfamoyt group (for example, dimethylsulfamoyl), a sulfinamoyl group (for example, methylsulfinamoyl), an alkoxysulfonyl group (for example, methoxysulfonyl), a thioacyl group (for example, methylthiocarbonyl), a thiocarbamoyl group (for example, methylthiocarbamoyl), or a heterocyclic group (for example, pyridinyl, pyridinium).

B in Formula [H] may form $—N{=}C(R_9)(R_{10})$ together with $A_2$ and a nitrogen atom, wherein $R_9$ represents a substituted or unsubstituted alkyl, aryl, or heterocyclic group, and $R_{10}$ represents a hydrogen atom or a substituted or unsubstituted alkyl, aryl or heterocyclic group.

B is preferably an acyl group.

$A_1$ and $A_2$ represent both hydrogen atoms or one of $A_1$ and $A_2$ represents a hydrogen atom and the other represents an acyl group (acetyl, trifluoroacetyl, benzoyl), a sulfonyl group (methanesulfonyl, toluenesulfonyl) or an oxalyl group (ethoxalyl).

Of compounds by represented by Formula [H] a compound represented by the following Formula [H'] is preferable.

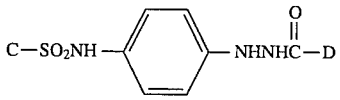

Formula [H']

wherein C represents the same as A in Formula [H] and D represents

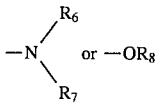

wherein $R_6$ and $R_7$ independently represent a hydrogen atom, a substituted or unsubstituted atkyl, alkenyl, alkinyl, aryl, or heterocyclic group, a substituted or unsubstituted alkoxy, alkenyloxy, alkinyloxy, aryloxy or heterocyclicoxy group, an amino group or a hydroxy group, provided that $R_6$ and $R_7$ may form a ring together with a nitrogen atom, $R_8$ represents a hydrogen atom or a substituted or unsubstituted alkyl, alkenyl, alkinyl, aryl or heterocyclic group.

Of the hydrazine compounds in the invention, the compound represented by the following Formula [Ha] is especially preferable:

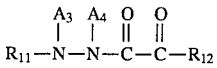

Formula [Ha]

wherein $R_{11}$ represents a substituted or unsubstituted aryl or heterocyclic group, $R_{12}$ represents

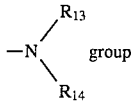

and $—OR_{15}$ group wherein $R_{13}$ and $R_{14}$ independently represent a hydrogen atom, a substituted or unsubstituted alkyl, alkenyl, alkinyl, aryl or heterocyclic group, a substituted or unsubstituted alkoxy, alkenyloxy, alkinyloxy, aryloxy or heterocyclicoxy group, an amino group or a hydroxy group, provided that $R_{13}$ and $R_{14}$ may form a ring together with a nitrogen atom, $R_{15}$ represents a hydrogen atom or a substituted or unsubstituted alkyl, alkenyl, alkinyl, aryl or heterocyclic group, and $A_3$ and $A_4$ are the same as $A_1$ and $A_2$ of Formula [H], respectively.

The Formula [Ha] will be described in detail below.

The aryl group represented by $R_{11}$ is preferably a single or condensed ring group, for example, a benzene ring group or a naphthalene ring group.

The heterocyclic group represented by $R_{11}$ is preferably a single or condensed ring group comprising a 5- or 6-membered heterocycle having one hetero atom selected from a nitrogen, sulfur and oxygen atom, such as a pyridine ring, a quinoline ring, a pyrimidine ring, a thiophene ring, a furan ring, a thiazole ring or a benzothiazole ring.

$R_{11}$ is preferably a substituted or unsubstituted aryl group. The substituent is the same as that of A in Formula [H]. $R_{11}$ is preferably a group having at least one sulfo group when a developer having pH of not more than 11.2 is used for high contrast.

$A_3$ and $A_4$ are the same as $A_1$ and $A_2$ of Formula [H] , respectively, and are preferably simultaneously hydrogen atoms.

$R_{12}$ represents

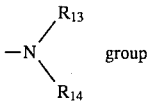

and $—OR_{15}$ group wherein $R_{13}$ and $R_{14}$ independently represent a hydrogen atom, a substituted or unsubstituted alkyl group (methyl, ethyl or benzyl), a substituted or unsubstituted alkenyl group (allyl, butenyl), a substituted or unsubstituted alkinyl group (propagyl, butinyl), a substituted or unsubstituted aryl group (phenyl, naphthyl), a substituted or unsubstituted heterocyclic group (2,2,6,6-tetramethylpiperidinyl, N-benzylpiperidinyl, quinolidinyl, N,N'-diethylpyrazolidinyl, N-benzylpyrrolidinyl, pyridyl), a substituted or unsubstituted amino group (amino, methylamino, dimethylamino, dibenzylamino), a hydroxy group, a substituted or unsubstituted alkoxy group (methoxy, ethoxy), a substituted or unsubstituted alkenyloxy group (allyloxy), a substituted or unsubstituted alkinyloxy group (propagyloxy), a substituted or unsubstituted aryloxy group (phenoxy) or a substituted or unsubstituted heterocyclic group (pyridyl), provided that $R_{13}$ and $R_{14}$ may combine each other with a nitrogen atom to form a ring (piperidine, morpholine), and $R_{15}$ represents a hydrogen atom, a substituted or unsubstituted alkyl group (methyl, ethyl, methoxyethyl or hydroxyethyl), a substituted or unsubstituted alkenyl group (allyl, butenyl), a substituted or unsubstituted alkinyl group (propagyl, butinyl), an aryl group phenyl, naphthyl), or a substituted or unsubstituted heterocyclic group (2,2,6,6-tetramethylpiperidinyl, N-methylpiperidinyl, pyridyl).

Of compounds by represented by Formula [H-a] a compound represented by the following Formula [H-a'] is preferable.

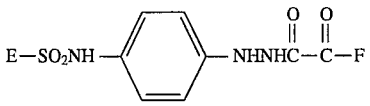

Formula [H-a']

wherein E represents the same as A in Formula [H] and F represents

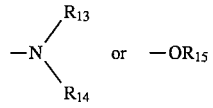

wherein $R_{13}$ and $R_{14}$ independently represent a hydrogen atom, a substituted or unsubstituted alkyl, alkenyl, alkinyl, aryl, or heterocyclic group, a substituted or unsubstituted alkoxy, alkenyloxy, alkinyloxy, aryloxy or heterocyclicoxy group, an amino group or a hydroxy group, provided that $R_{13}$ and $R_{14}$ may form a ring together with a nitrogen atom, $R_{15}$ represents a hydrogen atom or a substituted or unsubstituted alkyl, alkenyl, alkinyl, aryl or heterocyclic group.

The Exemplified compounds represented by Formulas [H] and [Ha] will be shown below, but the invention is not limited thereto.

H-1

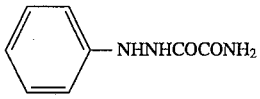

H-2

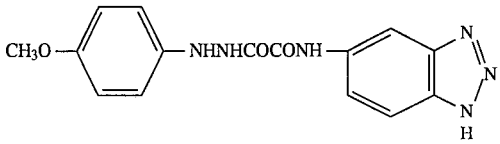

H-3

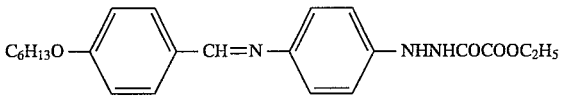

H-4

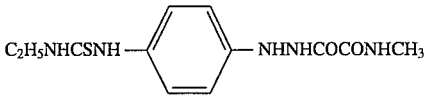

H-5

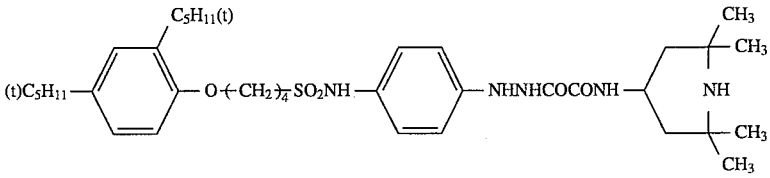

H-6

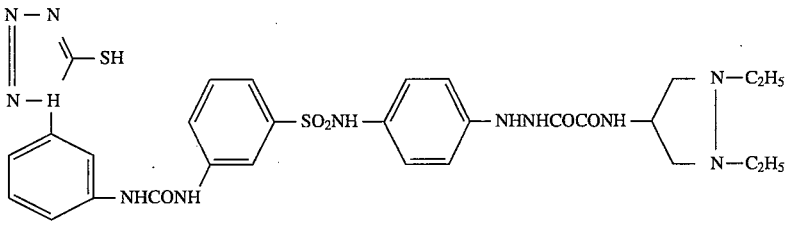

H-7

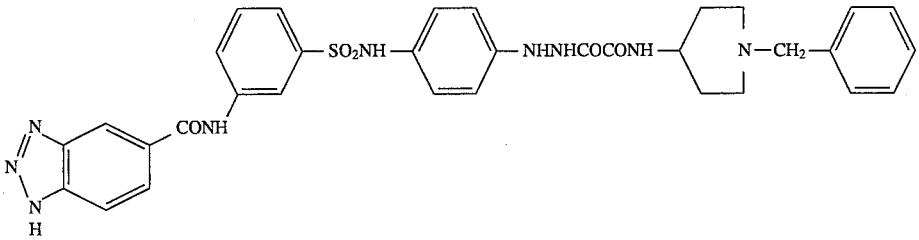

-continued
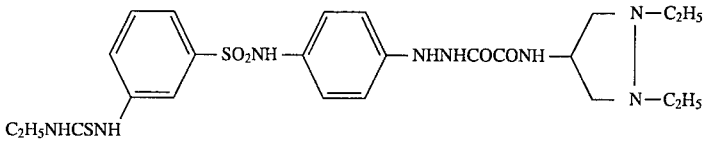
H-8
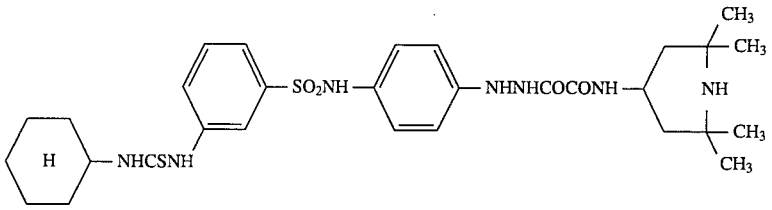
H-9
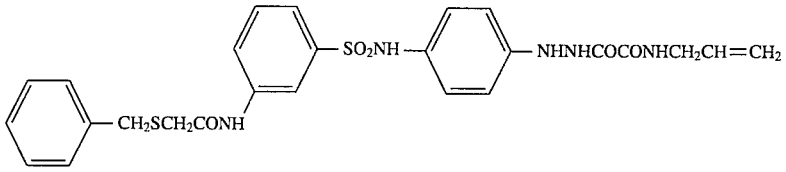
H-10
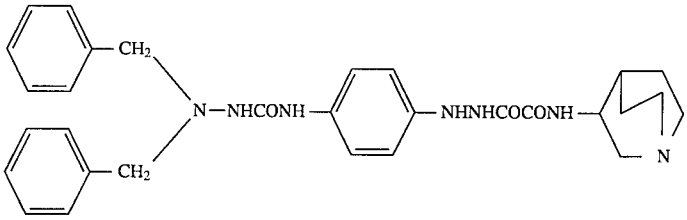
H-11
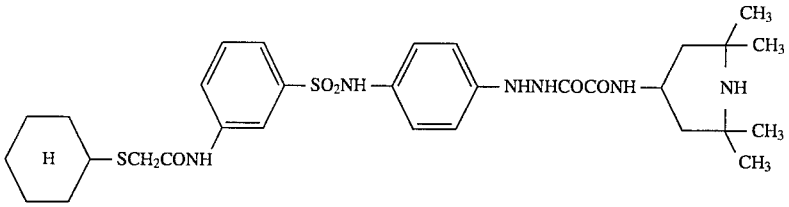
H-12
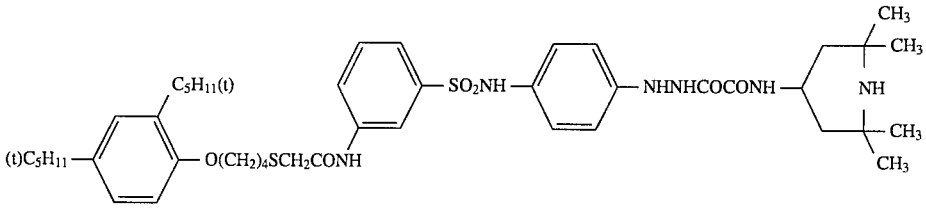
H-13
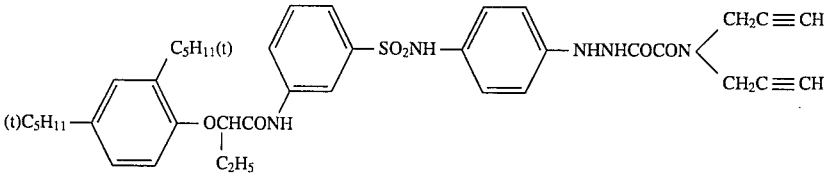
H-14
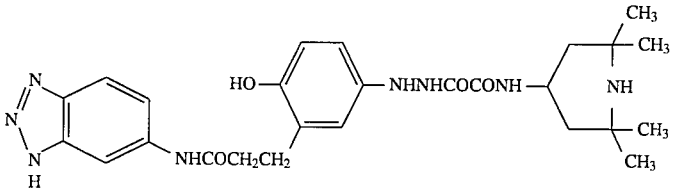
H-15

-continued
H-16
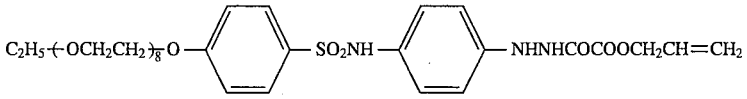
H-17
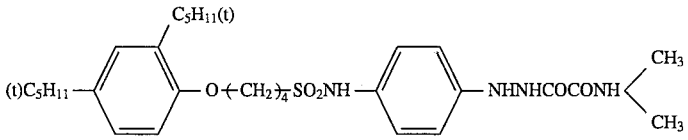
H-18
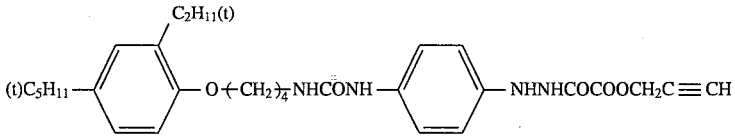
H-19
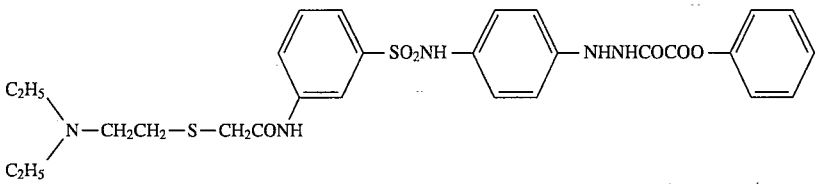
H-20
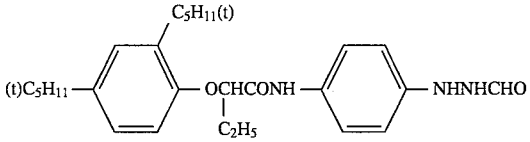
H-21
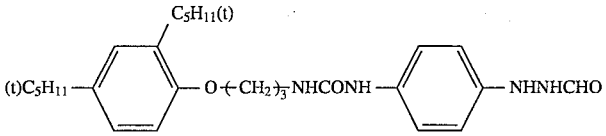
H-22
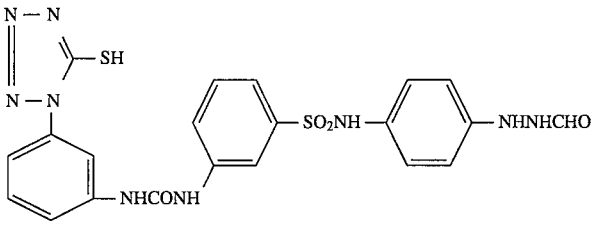
H-23
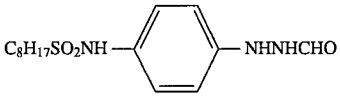
H-24
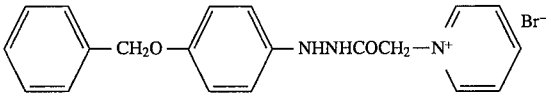
H-25
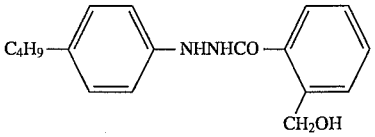
H-26
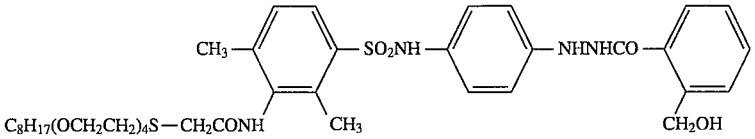

-continued
H-27
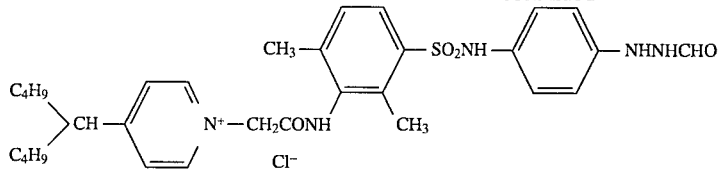
H-28
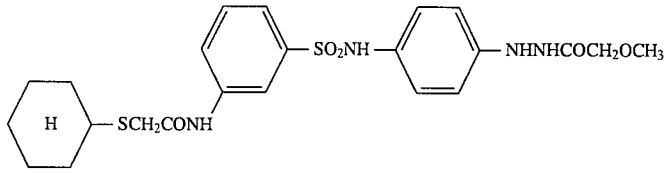
H-29
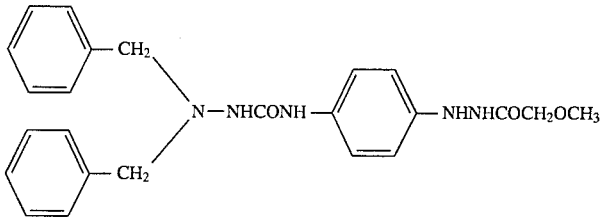
H-30
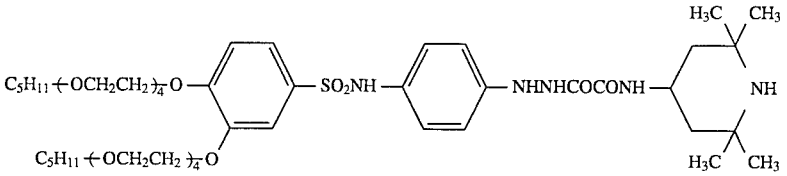
H-31
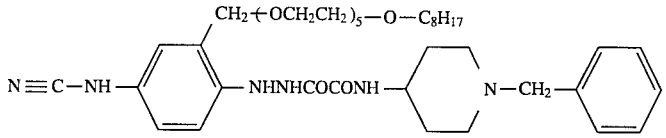
H-32
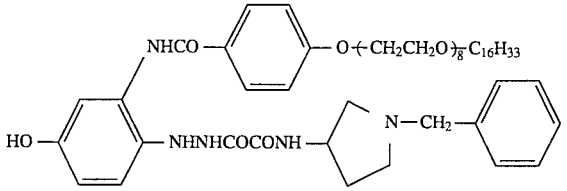
H-33
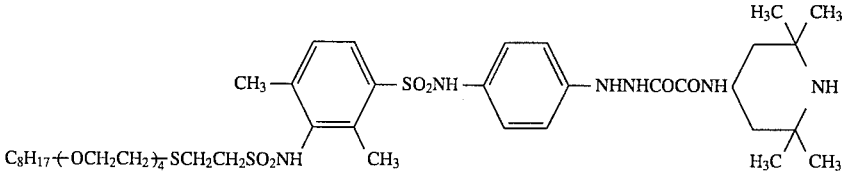
H-34
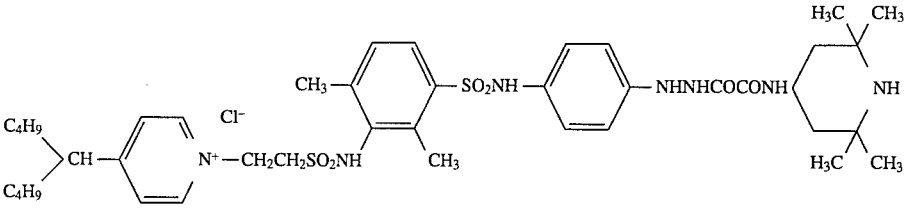

-continued
H-35
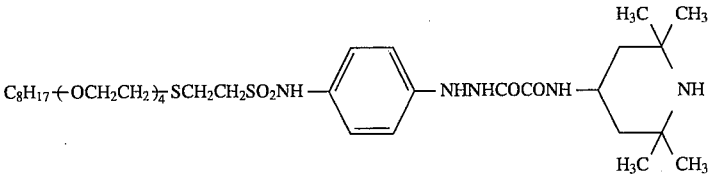
H-36
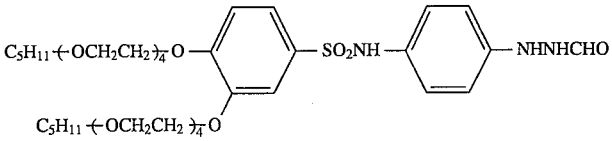
H-37
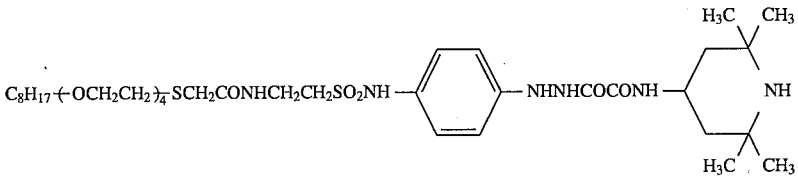
H-38
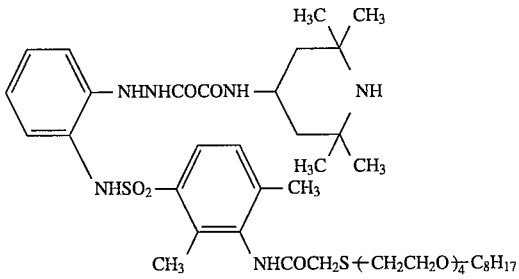
H-39
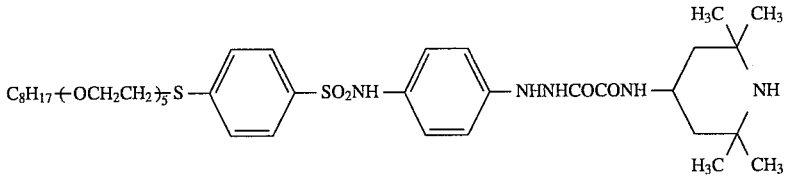
H-40
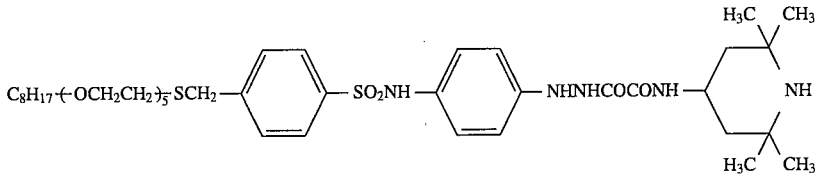
H-41
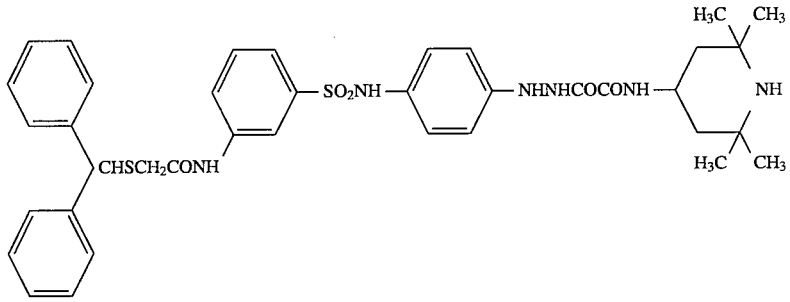
H-42
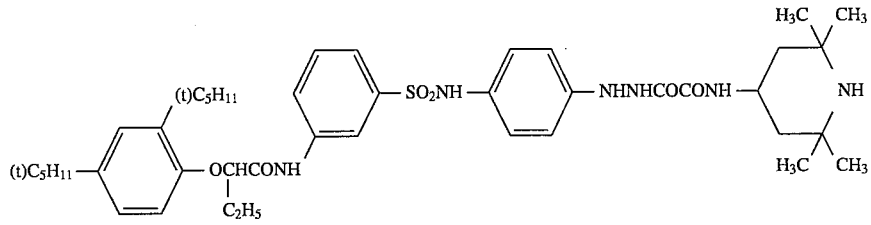

-continued

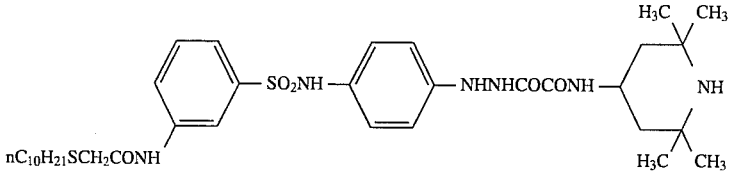

H-43

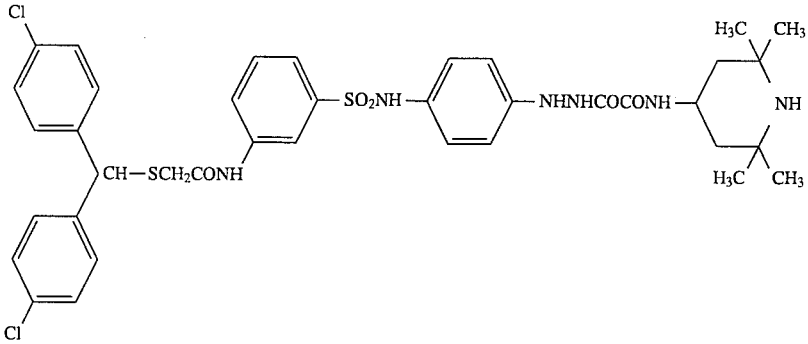

H-44

The synthetic method of a compound represented by Formula [H] is referred to in Japanese Patent O.P.I. Publication Nos. 62-180361, 62-178246, 63-234245, 63-234246, 64-90439, 2-37, 2- 841, 2-947, 2-120736, 2-230233 and 3-125134, U.S.Patent Nos. 4,686,167, 4,988,604 and 4,994,365, European Patent Nos. 253,665 and 333,435.

The content of the compound of the invention represented by Formula [H] is preferably $5\times10^{-7}$ to $5\times10^{-1}$ mol/mol of silver, and more preferably $5\times10^{-6}$ to $5\times10^{-2}$ mol/mol of silver.

In the invention the compound represented by Formula [H] is contained in the silver halide emulsion layer or its adjacent hydrophilic colloid layers of a photographic light sensitive material.

The silver halide photographic light-sensitive material of the invention preferably contains the following nuclear promoting agent to promote nuclear development.

The nuclear promoting agent includes a compound represented by the following Formula [Na] or [Nb]:

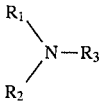

Formula [Na]

-continued

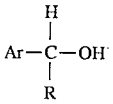

Formula [Nb]

In Formula [Na] $R_1$, $R_2$ and $R_3$ independently represent a hydrogen atom, an alkyl group, a substituted alkyl group, an alkenyl group, a substituted alkenyl group, an alkinyl group, a substituted alkinyl group, an aryl group or a substituted aryl group, provided that $R_1$, $R_2$, and $R_3$ are not simultaneously hydrogen atoms and $R_1$, $R_2$ and $R_3$ may form a ring together. The preferable agent is an aliphatic tertiary amines. These compounds preferably have in the molecules an anti-diffusible group or a silver halide adsorption group. The compounds having anti-diffusible property have preferably a molecular weight not less than 100, and more preferably a molecular weight not less than 300. The preferable adsorption group include a heterocyclic, mercapto, thioether, thion or thiourea group.

The examples thereof will be shown below.

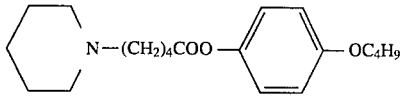

Na-1

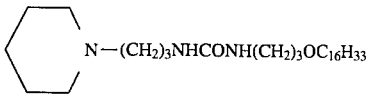

Na-2

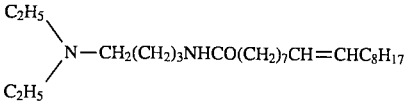

Na-3

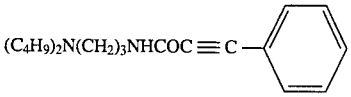

Na-4

-continued
Na-5
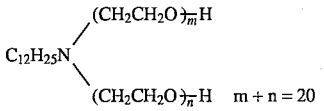
Na-6
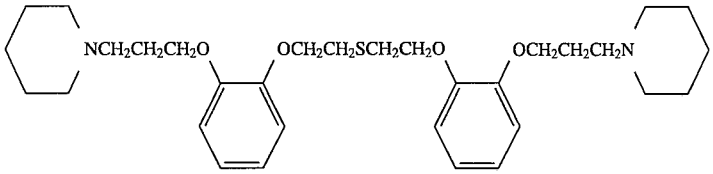
Na-7
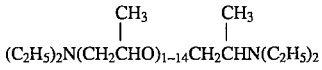
Na-8
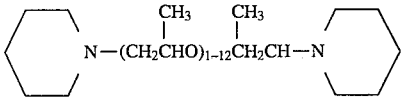
Na-9
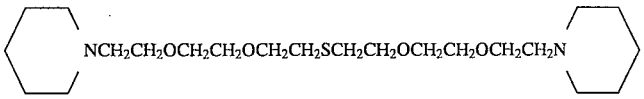
Na-10
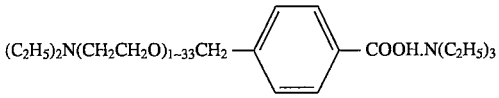
Na-11
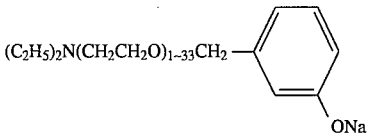
Na-12
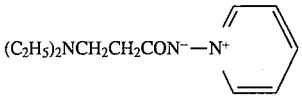
Na-13
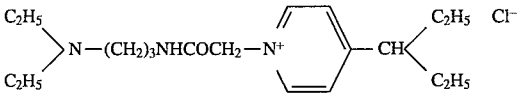
Na-14
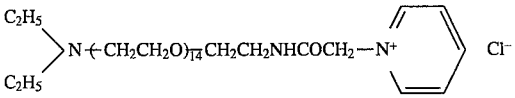
Na-15
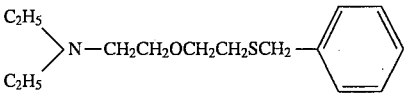
Na-16
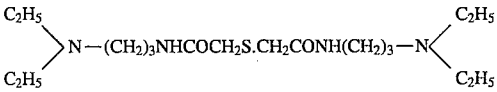
Na-17
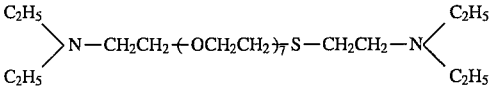
Na-18
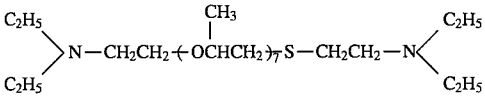

-continued

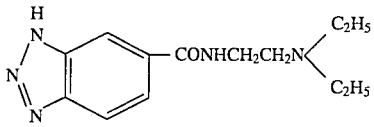

Na-19

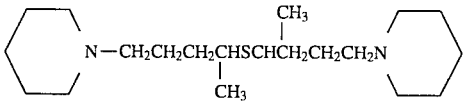

Na-20

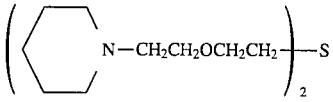

Na-21

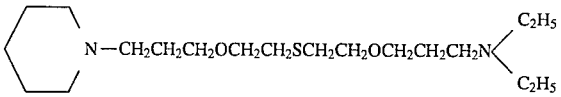

Na-22

In Formula [Nb] Ar represents a substituted or unsubstituted aryl or heterocyclic group, R represents a hydrogen atom or an alkyl group, an alkenyl group, an alkinyl group or an aryl group , each of which may have a substituent. These compounds preferably have in the molecules an anti-diffusible group or a silver halide adsorption group. The compounds having anti-diffusible property have preferably a molecular weight not less than 120, and more preferably a molecular weight not less than 300.

The examples thereof will be shown below.

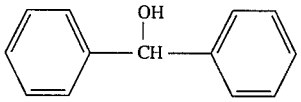

Nb-1

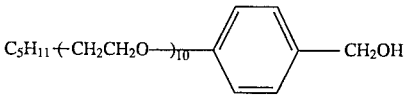

Nb-2

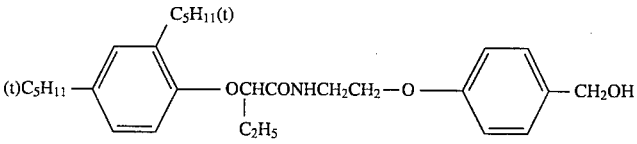

Nb-3

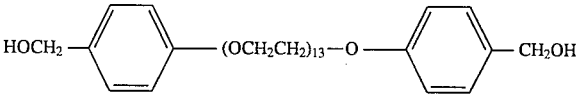

Nb-4

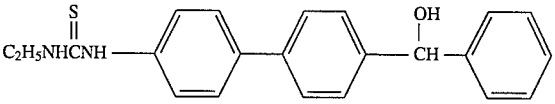

Nb-5

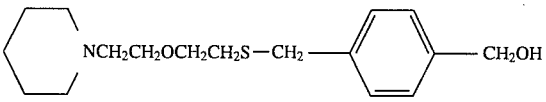

Nb-6

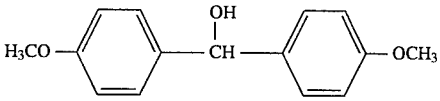

Nb-7

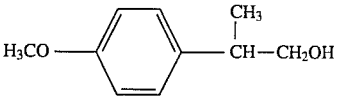

Nb-8

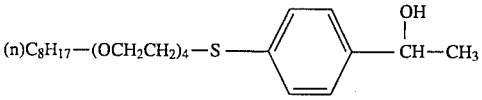

Nb-9

The compound represented by the following Formula [Na'] is preferable.

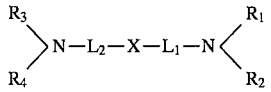

Formula [Na']

In Formula [Na'] $R_1$, $R_2$, $R_3$ and $R_4$ independently represent a hydrogen atom, an alkyl group, a substituted alkyl group, an alkenyl group, a substituted alkenyl group, an alkinyl group, a substituted alkinyl group, an aryl group, a substituted aryl group or a saturated or unsaturated heterocyclic group, provided that $R_1$, $R_2$, $R_3$ and $R_4$ may form a ring together, $R_1$ and $R_2$ are not simultaneously hydrogen atoms, and $R_3$ and $R_4$ are not simultaneously hydrogen atoms. The preferable agent is an aliphatic tertiary amine.

Of these nuclear promoting agents, those having at least one —($CH_2CH_2O$)— group are more preferable.

The tetrazolium compound used in the light-sensitive material of the invention is generally represented by the following formula (T).

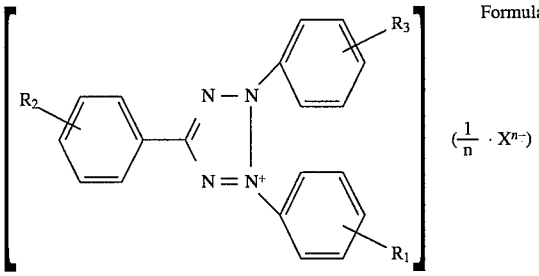

Formula (T)

In the embodiment of the invention, the substituents $R_1$, $R_2$ and $R_3$ on the phenyl group of the triphenyltetrazolium compound represented by Formula (T) preferably represent a hydrogen atom or a group having a negative or positive Hammett's sigma value (OP), which is a measure of the electron withdrawing property. Particularly preferred are those having a negative Hammett's sigma value.

Details of Hammett's sigma value in phenyl substitution can be seen in various literatures, for example, in C. Hansch's report in Journal of Medical Chemistry, Vol. 20, p. 304 (1977). Those having a particularly preferred negative sigma value include, for example, methyl (σP: −0.17, a value hereinafter given in parentheses is σP), ethyl (−0.15), cyclopropyl (−0.21), n-propyl (−0.13), iso-propyl (−0.15), cyclobutyl (−0.15), n-butyl (−0.18), iso-butyl (−0.20), n-pentyl (−0.15), cyclohexyl (−0.22), amino (−0.66), acethylamino (−0.15), hydroxyl (−0.37), methoxy (−0.27), ethoxy (−0.24), propoxy (−0.25), buthoxy (−0.32) and pentoxy (−0.34), each of which is useful as a substituent for the compound of the invention represented by Formula (T).

n represents 1 or 2, and $X^-$ represents an anion.

The anion represented by $X^-$ includes, for example, halogen ions such as a chloride ion, a bromide ion, or a iodide ion; acid residues of inorganic acids such as nitric acid, sulfuric acid, perchloric acid; acid residues of organic acids such as sulfonic acids, carboxylic acids, and anions of anionic surfactants, for example, lower alkylbenzene sulfonic acid anions such as a p-toluenesulfonic acid anion; higher alkylbenzene sulfonic acid anions such as a p-dodecylbenzene sulfonic acid anion; higher alkyl sulfate anions such as a lauryl sulfate anion; boron type anions such as a tetraphenyl boron; dialkyl sulfosuccinate anions such as a di-2-ethylhexyl sulfosuccinate anion; polyether alcohol sulfate anions such as acetyl polyethenoxy sulfate anion; higher fatty acid anions such as a stearic acid anion; and polymers having acid residues such as a polyacrylic acid anion.

Typical examples of the compound represented by Formula (T) are illustrated below, but suitable tetrazolium compounds are by no means limited to them.

| Compound No. | $R_1$ | $R_2$ | $R_3$ | $X^{n-}$ |
|---|---|---|---|---|
| T-1 | H | H | p-$CH_3$ | $Cl^-$ |
| T-2 | p-$CH_3$ | H | p-$CH_3$ | $Cl^-$ |
| T-3 | p-$CH_3$ | p-$CH_3$ | p-$CH_3$ | $Cl^-$ |
| T-4 | H | p-$CH_3$ | p-$CH_3$ | $Cl^-$ |
| T-5 | p-$OCH_3$ | p-$CH_3$ | p-$CH_3$ | $Cl^-$ |
| T-6 | p-$OCH_3$ | H | p-$CH_3$ | $Cl^-$ |
| T-7 | p-$OCH_3$ | H | P-$OCH_3$ | $Cl^-$ |
| T-8 | m-$C_2H_5$ | H | m-$C_2H_5$ | $Cl^-$ |
| T-9 | p-$C_2H_5$ | p-$C_2H_5$ | p-$C_2H_5$ | $Cl^-$ |
| T-10 | p-$C_3H_7$ | H | p-$C_3H_7$ | $Cl^-$ |
| T-11 | p-iso$C_3H_7$ | H | p-iso$C_3H_7$ | $Cl^-$ |
| T-12 | p-$OC_2H_5$ | H | p-$OC_2H_5$ | $Cl^-$ |
| T-13 | p-$OCH_3$ | H | p-iso$C_3H_7$ | $Cl^-$ |
| T-14 | H | H | p-n$C_{12}H_{25}$ | $Cl^-$ |
| T-15 | p-n$C_{12}H_{25}$ | H | p-n$C_{12}H_{25}$ | $Cl^-$ |
| T-16 | H | p-$NH_2$ | H | $Cl^-$ |
| T-17 | p-$NH_2$ | H | H | $Cl^-$ |
| T-18 | p-$CH_3$ | H | p-$CH_3$ | $ClO_4^-$ |

The above tetrazolium compounds can be easily synthesized, for example, by the method described in Chemical Reviews, Vol. 55, pp. 335–483.

The tetrazolium compounds represented by formula (T) may be used singly or in combination of two or more kinds at a proper ratio.

The silver halide emulsion used in the light-sensitive material in the invention may be obtained by any of an acidic, neutral and ammonium method, and comprises grains having a particle size of preferably 0.2 to 0.5 μm. In the silver halide grains of the silver halide emulsion in the invention water soluble rhodium or iridium salts are added to the emulsion to contain the salts inside or on the surface of the grains. The adding amount of the salts is preferably $10^{-6}$ to $10^{-9}$ mol of mol of silver.

The silver halide grains are silver chloride or silver bromochloride or silver iodobromochloride containing not less than 90 mol % of silver chloride. The grains may be grains having a uniform halide composition or core/shell grains where the halide composition inside the grains is different from that of the outer layer of the grains. The grains may be ones forming a latent image mainly on the surface or ones a latent image forming mainly inside the grains.

The silver halide grains in any form can be used in the invention. One preferable example is cubic grains having {100} face as a crystal surface. The octahedral, tetradecahedral or dodecahedral grains are prepared according to a method described in U.S. Pat. Nos. 4,183,756 and 4,225,666, Japanese Patent O.P.I. Publication No. 55-26589, Japanese Patent Publication No. 55-42737 or J. Photgr. Sci., 21, 39(1973) and can be used. Grains having a twin plane may also be used.

The silver halide grains in the invention may be in a single form or in a mixture of various forms. The silver halide emulsion in the invention may have any particle size distribution. The silver halide emulsion having a broad particle size distribution (polydisperse emulsion) or a narrow particle size distribution (monodisperse emulsion) may be used singly or in admixture of several kinds of the emulsions. The polydisperse emulsion and monodisperse emulsion may be used in combination. Two or more kinds of silver halide emulsions prepared separately may be used in combination. The monodisperse emulsion is preferably used in the invention. The monodisperse silver halide grains in the monodisperse emulsion are grains comprising grains having a particle size falling within ±20% of a deviation from an average particle size, r in an amount preferably not less than 60% by weight, more preferably not less than 70% by weight, and most preferably not less than 80% by weight based on the total silver halide grains.

Herein the average particle size, r is defined to be particle size $r_i$ when $n_i \times r_i^3$ is maximum, wherein $n_i$ represents frequency of grains having a particle size of $r_i$.

(The number of significant figures is three from the maximum digit, and the calculated figure is rounded off to the three digit)

The particle size referred to herein is the diameter when silver halide grains are spherical, and the diameter of a circle to which the area of the projected image of the grains is converted, when in a shape other than a sphere. The particle size can be obtained by measuring the grain diameter or an area of the projected image of the grains on a print which were photographed magnified 10,000 to 50,000 times by an electonmicroscope (the number of grains should be not less than 1000 selected randomly).

The high monodisperse emulsion of the invention has a monodisperse degree of preferably not more than 20, and a monodisperse degree of more preferably not more than 15. Herein the monodisperse degree is defined by the following equation:

Monodisperse degree=(Standard deviation of the particle size)×100/(Average particle size)

Herein the average particle size and standard deviation of the particle size can be obtained by $r_i$ as defined above. The monodisperse emulsion can be obtained by a method described in Japanese Patent O.P.I. Publication Nos. 54-48521, 58-49938 and 60-122935.

The light sensitive silver halide emulsion used in the invention can be a chemically unsensitized emulsion, which is called a primitive emulsion, but is usually chemical-sensitized. As the chemical sensitization method is used a method described in the aforementioned literature by Glafkides or Zetikman, or "Die Grundlagen der Photographischen Prozesse mit Silberhalogeniden" edited by H. Frieser, Akademische Verlagsgesellschaft (1968). There is a sulfur sensitization method using a sulfur-containing compound or active gelatin capable of reacting with silver ion, a reduction sensitization method using a reducing agent or a method using gold or other noble metals. The sulfur sensitizer includes a thiosulfate, a thiourea, a thiazole, a rhodanine, and so forth. The example thereof is described in U.S. Pat. Nos. 1,574,944, 2,410,689, 2,278,947, 2,728,668 and 3,656,955. The reduction sensitizer includes a stannous salt, amines, a hydrazine derivative, formamidinesulfinic acid, and a silane compound. The example thereof is described in U.S. Pat. Nos. 2,487,850, 2,419,974, 2,518,698, 2,983,609, 2,983,610 and 3,694,637. The noble metal sensitizer includes a gold complex or a complex of a metal belonging to the VII Group of the Periodic Table such as platinum, iridium or palladium and examples thereof is described in U.S. Pat. Nos. 2,399,083 and 2,448,060 or British Patent No. 618,061. The pH, pAg or temperature during the chemical sensitization is not specifically limited, but the pH is 4–9, and preferably 5–8, the pAg is 5–11, and preferably 7–9, and the temperature is 40°–90° C., and preferably 45°–75° C. The photographic emulsion used in the invention is subjected to the above sulfur or gold-sulfur sensitization and further to reducing sensitization using a reducing agent or noble metal sensitization. As the light sensitive emulsion, the above emulsion may be used singly or two kinds or more kinds of emulsions in combination. According to the invention, after the completion of the chemical sensitization, various stabilizing agents such as 4-hydroxy-6-methyl-1,3,3a,7-tetrazaindene, 5-mercapto-1-phenyltetrazole and 2-mercapto-benzothiazole are used. Silver halide solvent like thioethers, mercapto group-containing compounds or crystal habit controlling agents like sensitizing dyes may be optionally used.

The unnecessary soluble salts in the emulsion in the invention may be removed after completion of silver halide growth, and the emulsion may contain the soluble salts. The salts can be removed according to a method described in Research Disclosure 17643.

The various additives can be added to the above photographic emulsion in the invention in order to prevent lowering of sensitivity and occurrence of fog in the process of its manufacturing or during its storing or processing. That is, to the emulsion can be added, compounds well known as stabilizers, azoles such as benzothiazolium salts, nitroindazoles, triazoles, benzotriazoles or benzimidazoles (especially, ones having a nitro or halogen group), mercapto heterocyclic compounds such as mercaptothiazoles, mercaptobenzimidazoles, mercaptotetrazoles (especially, 1-phenyl-5-mercaptotetrazole) or mercaptopyridines, the above heterocyclic compounds or mercapto compounds having a water solubilizing group such as a carboxyl group or a sulfo group, thioketone compounds such as oxazolinethions, azaindenes such as tetraazaindenes (especially, 4-hydroxy-(1,3,3a,7)-tetraazaindenes), benzenethiosulfonic acids or benzenesulfinic acids.

The example used is described in literature by K. Mees, The Theory of the Photographic Process, the 3rd Edition (1966). These further detailed examples or the use thereof are referred to in U.S. Pat. Nos. 3,954,474, 3,982,947 and 3,021,248 and Japanese Patent Publication No. 52-28660.

The silver halide photographic light-sensitive material in the invention can contain in its photographic structural layer atkylacrylate latexes described in U.S. Pat. Nos. 3,411,911 and 3,411,912 and Japanese Patent Publication No. 45-5331.

The silver halide photographic light-sensitive material in the invention may contain the following various additives. The thickener or plasticizer includes a compound such as styrene-sodium maleate copolymer or dextrane sulfate described in U.S. Pat. No. 2,960,404, Japanese Patent Publication No.43-4939, German Patent Publication No. 1,904,604, Japanese Patent O.P.I. Publication No. 48-63715, Belgium Patent No. 762,833, U.S. Pat. No. 3,767,410, and Belgium Patent No. 588,143. The hardener includes aldehydes, epoxy compounds, ethyleneimines, active halogenides, vinylsulfones, isocyanates, sulfonic acid esters, carbodiimides, mucochloric acid or acyloyls. The UV absorbent includes a compound described in U.S. Pat. No. 3,253,921 and British Patent No. 1,309,349 such as 2-(2'-hydroxy-5-tert-butylphenyl)benzotriazole, 2-(2'-hydroxy-3',5'di-tert-butylphenyl)benzotriazole, 2-(2-hydroxy-3'-tert-butyl-5'-butylphenyl)-5-chlorobenzotriazole or 2-(2'-hydroxy-3',5'-di-tert-butylphenyl)-5-chlorobenzotriazole. The surfactants, which are used as an agent improving permeability of an auxiliary coating agent, an emulsifier or processing solutions, an anti-forming agent or various agents for controlling physical properties of light sensitive materials, include an anionic, cationic or nonionic surfactant described in British Patent Nos. 548,532 and 1,216,389, U.S. Pat. No. 2,026,202 and 3,514,293, Japanese Patent Publication Nos. 44-26580, 43-17922, 43-17926, 43-3166 and 48-20785, French Patent No. 202,588, Belgium Patent No. 773,459 and Japanese Patent O.P.I. Publication No. 48-101118. Of these surfactants, the anionic surfactants having a sulfo group such as sulfosuccinates or alkylbenzenesulfonates are preferable. The anti-static agent includes compounds described in Japanese Patent Publication No. 46-24159, Japanese Patent O.P.I. Publication No. 48-89979, U.S. Pat. Nos. 2,882,157 and 2,972,535, Japanese Patent O.P.I. Publication Nos.48-20785, 48-43130 and 48-90391, Japanese Patent Publication Nos. 46-24159, 46-39312 and 48-43809 and Japanese Patent O.P.I. Publication No. 47-33627.

In the manufacturing the light-sensitive material of the invention, pH of the coating solution is preferably 5.3–7.5.

In the case of multilayer-coating, the pH of a mixture coating solution, in which a coating solution for each respective coating layer is mixed in respective amounts, is preferably 5.3–7.5. When the pH is lower than 5.3, the hardening speed is low, and when pH is higher than 7.5, photographic properties are adversely affected.

The light-sensitive material in the invention may contain in its structural layer a lubricant, such as a higher aliphatic alcohol ester described in U.S. Pat. Nos. 2,588,756 and 3,121,060, casein described in U.S. Pat. No. 3,295,979, a higher aliphatic calcium salt described in British Patent No. 1,623,722 or a silicone compound described in British Patent No. 1,313,384, U.S. Pat. Nos. 3,042,522 and 3,489,567. A liquid paraffin dispersion can also be used for this purpose.

The various additives are further used in the light sensitive material in the invention, according to objects. The additives are detailed in Research Disclosure, Vol. 176, Item/7643, (Dec., 1978) and, ibid., Vol. 187, Item/8716, (Nov., 1979). The pages and columns where the additives are described will collectively be shown below.

| | Additive | RD17643 | RD18716 |
|---|---|---|---|
| 1. | Chemical sensitizer | p. 23 | p. 648, r. col. |
| 2. | Sensitivity increaser | | " |
| 3. | Spectral sensitizer | pp. 23~24 | p. 648, r. col. |
| | Supersensitizer | | p. 649, r. col. |
| 4. | Whitening agent | p. 24 | |
| 5. | Antifoggant & stabilizer | pp. 24~25 | p. 649, r. col. |
| 6. | Light absorbent & | | |
| | filter dye | pp. 25~26 | p. 649, r. col. |
| | UV absorbent | | p. 650, l. col. |
| 7. | Antistaining agent | p. 25, r. col. | p. 650, 1–r. col. |
| 8. | Dye-image stabilizer | p. 25 | |
| 9. | Layer hardener | p. 26 | p. 651, l. col. |
| 10. | Binder | p. 26 | " |
| 11. | Plasticizer & lubricant | p. 27 | p. 650, r. col. |
| 12. | Coating aid & surfactant | pp. 26~27 | " |
| 13. | Antistatic agent | p. 27 | " |

The processing method of the silver halide photographic light-sensitive material in the invention is not specifically limited, and various processing methods can be used. The processing temperature is usually 18° to 50° C., but temperatures lower than 18° C. or higher than 50° C. can be employed.

In the invention the following developing agent of a black and white developer is used singly or in combination: dihydroxy benzenes like hydroquinone, 3-pyrazolidone like 1-phenyl-3-pyrazolidone, and aminophenols like N-methyl-p-aminophenol.

The developer used in the invention further contains an alkali agent.

The developer of the invention contains a carbonate salt in an amount of preferably 0.2 to 1.0 ml/liter, and more preferably 0.35 to 0.7 mol/liter. The developer of the invention further contains boric acid or a borate in an amount of preferably $1.6\times10^{-2}$ to $3.3\times10^{1}$ mol/liter, more preferably $4.85\times10^{-2}$ to $1.6\times10^{-1}$ mol/liter, and still more preferably $8.0\times10^{-2}$ to $1.3\times10^{-1}$ mol/liter. The ratio, potassium ion/sodium ion in the developer of the invention is preferably 0.2 to 10, and more preferably 0.5 to 2. Further, the replenisher for developer is supplied to the developer in an amount of preferably 50 to 200 ml per $m^2$ of the material.

The silver halide photographic light-sensitive material in the invention can be processed with a developer containing imidazols as a silver halide solvent or a developer containing the silver halide solvent and additives such as indazoles or triazols. Besides the above compounds the developer usually contains various preservatives, alkali agents, pH buffering agents, or anti-foggants, and further optionally contains an auxiliary solubility agent, a development accelerator, a surfactant, an anti-foaming agent, a water softening agent, a hardener or a viscosity increasing agent.

A fixer having a conventional composition can be used. The fixer may contain a soluble aluminum salt as a hardener.

The exposure of the photographic emulsion in the invention can be carried out using various light sources such as tungsten lamps, fluorescent lamps, an arc lamp, a mercury lamp, a xenon-sunlight lamp, a xenon flash, a cathode-ray tube flying spot, a laser light, an electron beam, a X-ray and a fluorescent screen on a X-ray photographing according to chemical sensitization of the emulsion or objects used. The exposure time is usually 1/1000 to 100 seconds, and short exposure time of $10^{-4}$ to $10^{-9}$ seconds applies in the case of a laser light.

EXAMPLES

The invention will be detailed in the following examples.

Example 1

(Preparation of silver halide emulsion A)

A silver bromoiodochloride emulsion having a silver chloride content of 90 mol % and a silver iodide content of 0.2 mol % was prepared in a double-jet precipitation method. In the process $K_3RhBr_6$ was added in an amount of $5.0\times10^{-5}$ mol/mol of silver. The resulting emulsion was proved to be an emulsion comprising cubic monodisperse grains having an average particle diameter of 0.20 μm (with a variation coefficient of 9%). The emulsion was desalted with denatured gelatin disclosed in Japanese Patent O.P.I. Publication No. 2-280139 (one in which an amino group in gelatin is substituted with a phenylcarbamyl group, for example, Exemplified compound G-8 in Japanese Patent O.P.I. Publication No. 2-280139). The resulting EAg after the desalting was 190 mv at 50° C. The resulting emulsion was adjusted to be pH 5.58 and EAg 123 mv, and the temperature thereof was elevated to 60° C. To the emulsion was added $2.2\times10^{-5}$ mol/mol of silver of chloroauric acid and the mixture was stirred for 2 minutes. To the mixture emulsion was added $2.9\times10^{-6}$ mol/mol of silver of $S_8$ and the mixture was chemically ripened for 78 minutes. After the ripening, the following compound was added thereto in terms of mol of silver. 4-hydroxy-6-methyl-1,3,3a,7-tetrazaindene of $7.5\times10^{-3}$ mol, $3.5\times10^{-4}$ mol of 1-phenyl-5-mercaptotetrazole and 28.4 g of gelatin was added to the emulsion to obtain an emulsion solution.

(Preparation of silver halide photographic light-sensitive material)

A 100 μm thick polyethylene terephthalate film subjected to anti-static treatment disclosed in Example 1 of Japanese Patent O.P.I. Publication No. 3-92175 was coated on the subbing layer on one side with the silver halide emulsion of the following prescription 1 to give a silver content of 3.3 $g/m^2$ and a gelatin content of 2.6 $g/m^2$. As a protective layer the coating solution of the following prescription 2 was coated on the emulsion layer to give a gelatin content of 1 $g/m^2$. The backing layer of the following prescription 3 was coated on the subbing layer on the other side to give a gelatin content of 2.7 $g/m^2$ and the backing protective layer of the following prescription 4 was coated on the backing layer to give a gelatin content of 1 $g/m^2$.

Prescription 1 (silver halide emulsion layer composition)

Hydrazine derivative

Exemplified compound (H-43) 850 mg/molAg

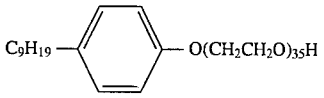

100 mg/m²

Nuclear promoting agent

Exemplified compound (Na-21) 800 mg/molAg

Latex polymer L-1

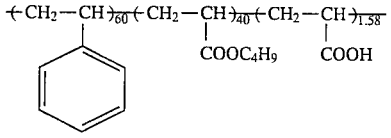

0.5 g/m²

Hardener H-1

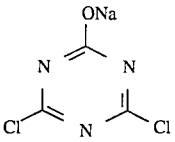

60 mg/m²

| | |
|---|---|
| S-1(sodium isoamyl-n-decylsulfosuccinate) | 0.64 mg/m² |
| Hydroquinone | 50 mg/m² |
| 2-mercapto-6-hydroxypurine | 60 mg/molAg |
| Compound P | 250 mg/molAg |
| EDTA | 50 mg/m² |
| 5-nitroindazole | 75 mg/molAg |
| Styrene-maleic acid copolymer | 30 mg/m² |

Compound P

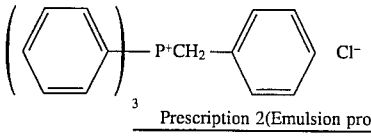

Prescription 2(Emulsion protective layer composition)

S-1 20 mg/m²

Matting agent:

monodisperse silica having an average particle size of 7 μm 15 mg/m² monodisperse silica having an average particle size of 3 μm 15 mg/m²

Dimezon S 20 mg/m²

Surfactant

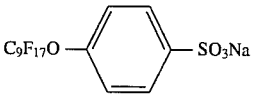

5 mg/m²

Dye
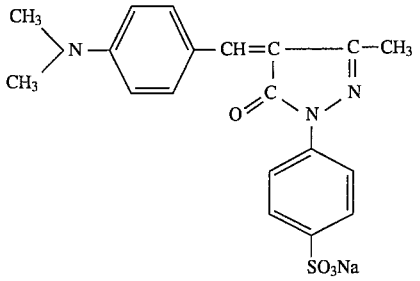
150 mg/m²
Prescription 3 (Backing layer composition)
| | |
|---|---|
| Saponin | 133 mg/m² |
| S-1 | 6 mg/m² |
| Colloid silica | 100 mg/m² |
Dye
(a)
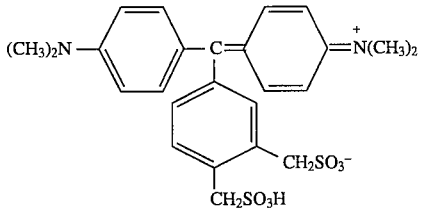
30 mg/m²
(b)
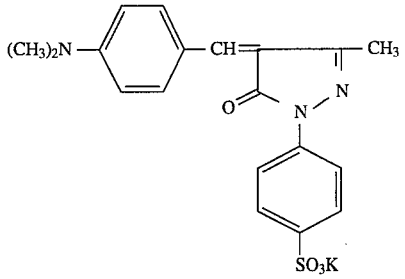
75 mg/m²
(c)
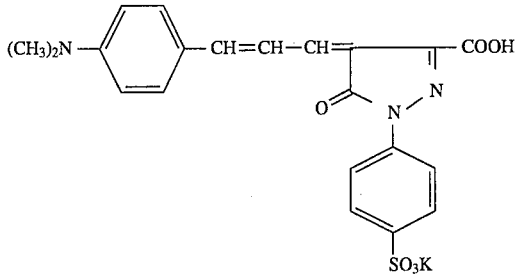
30 mg/m²
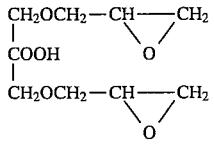
100 mg/m²
Prescription 4(Backing protective layer composition)
Matting agent:
| | |
|---|---|
| monodisperse polymethylmethacrylate having an average particle size of 5.0 μm | 50 mg/m² |
| Sodium di-(2-ethylhexyl)sulfosuccinate | 10 mg/m² |

The above obtained sample was in close contact with a step wedge and exposed using a light having a wavelength of 633 nm as a representative of He-Ne laser light. The exposed material was processed with the following developer and fixer under the following conditions, using a rapid automatic developing machine (GR-26 SR produced by Konica Corporation).

The sample processed with the processing solutions after 500 sheets of film measuring 508 mm×610 mm was processed in a replenishing amount of 150 ml/m$^2$ of developer replenisher and in a replenishing amount of 200 ml/m$^2$ of fixer replenisher was evaluated for running processing.

| (Developer Prescription) | |
|---|---|
| Sodium sulfite | 55 g/liter |
| Sodium carbonate | shown in Table 1 |
| Hydroquinone | 20 g/liter |
| 4-methyl-4-hydroxymethyl-1-phenyl-3-pyrazolidone (Dimeson) | 0.9 g/liter |
| Potassium bromide | 5 g/liter |
| Benzotriazole | 0.16 g/liter |
| Boric acid | shown in Table 1 |
| Diethyleneglycol | 40 g/liter |
| 2-mercaptohypoxanthine | 60 g/liter |

Add to make 1 liter and adjust pH with sodium hydroxide to be 10.4.

| (Fixer Prescription) | |
|---|---|
| Ammonium thiosulfate(72.5% W/V solution) | 240 ml |
| Sodium sulfite | 17 g |
| Sodium acetate trihydrate | 15.9 g |
| Acetic acid(90% W/V) | 18 g |
| Boric acid | 10 g |
| Tartaric acid | 1.0 g |
| Aluminum sulfate(an aqueous 8.1% W/V | 26.5 g |

-continued solution converted into an Al2O3 content)
Water added to make 1 liter.
Adjust pH with acetic acid to be 4.8.

| (Processing step) | (Processing condition) (Temperature) | (Time) |
|---|---|---|
| Developing | 35° C. | 30 seconds |
| Fixing | 33° C. | 20 seconds |
| Washing | room temp. | 20 seconds |
| Drying | 40° C. | 40 seconds |

The processed sample was measured using PDA-65 (Konica digital densitometer). The sensitivity in Table was indicated by a relative sensitivity to sensitivity at density 3.0 of Sample No.1 regarded as 100. The gamma value was measured for evaluation of image sharpness and indicated by a tangent between the densities 0.1 and 3.0. When the gamma value is less than 6, it can not be put into practical use. When the gamma value is 6 to less than 10, it is not a satisfactory contrast. The material having a gamma value of not less than 10 gives a ultra high contrast and can be put into practical use. The results are shown in Table 1.

TABLE 1

| Sample No. | Carbonate (mol/l) | Boric acid (mol/l) | K/Na ratio | Fresh solutions Sensitivity | Fresh solutions Gamma | Solutions after processing Sensitivity | Solutions after processing Gamma | Remarks |
|---|---|---|---|---|---|---|---|---|
| 1 | 0.15 | 0 | 0.1 | 100 | 11.0 | 90 | 10.1 | Comp. |
| 2 | 0.25 | 0 | 0.1 | 101 | 12.0 | 99 | 12.0 | Inv. |
| 3 | 0.4 | 0 | 0.1 | 102 | 12.0 | 99 | 11.9 | Inv. |
| 4 | 0.15 | $1.6 \times 10^{-2}$ | 0.1 | 101 | 11.1 | 89 | 9.9 | Comp. |
| 5 | 0.25 | $4.85 \times 10^{-2}$ | 0.1 | 101 | 12.0 | 100 | 11.9 | Inv. |
| 6 | 0.25 | 0 | 0.3 | 101 | 12.0 | 100 | 11.9 | Inv. |
| 7 | 0.25 | $4.85 \times 10^{-2}$ | 0.3 | 100 | 12.1 | 101 | 12.1 | Inv. |
| 8 | 0.4 | $3.2 \times 10^{-2}$ | 0.25 | 101 | 12.1 | 101 | 12.1 | Inv. |

As is apparent from above Table, the invention shows the less difference in the sensitivity and gamma value between the fresh and processed solutions.

Example 2

(Coating of anti-static layer)

A polyethylene terephthalate support which had been corona-charged in strength of 10(w/m2.min.) and then subbed with vinylidene chloride polymer was corona-charged in strength of 10(w/m2.min). Thereafter, the anti-static layer of the following composition was coated.

| | |
|---|---|
| Water soluble conductive polymer (P) | 0.7 g/m$^2$ |
| Hydrophobic latex (L) | 0.2 g/m$^2$ |
| Ammonium sulfate | 20 mg/m$^2$ |
| Hardener (E) | 0.1 g/m$^2$ |
| Polyethyleneglycol (molecular weight 600) P | 5.0 g/m$^2$ |

-continued

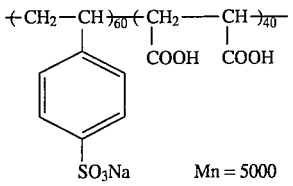

Mn = 5000

L

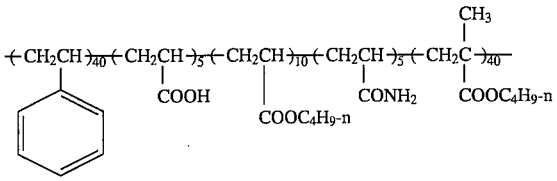

E

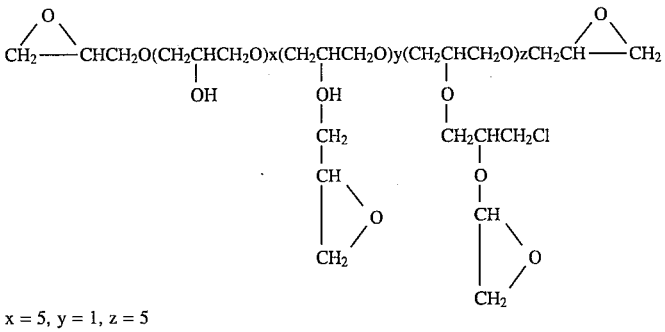

x = 5, y = 1, z = 5

(Preparation of Emulsion EM-1)

Monodisperse silver bromochloride grains containing $10^{-5}$ mol/mol of silver of a rhodium salt, and having a silver bromide content of 2 mol %, an average particle diameter of 0.20 μm and a monodisperse degree of 20 were prepared under an acidic atmosphere in a double-jet precipitation method. The growth of the grains was carried out in a system containing an aqueous 1% gelatin solution containing 30 mg/liter of benzyladenine. After mixing silver and halides, 600 mg of mol of silver of 6-methyl-4-hydroxy-1,3,3a,7-tetrazaindene of $7.5\times10^3$ mol was added to the mixture, and was washed and desalted. Thereafter, sodium thiosulfate was added to the emulsion for sulfur sensitization. To the above obtained emulsion was added the following additives to have a content of the following amount and the resulting emulsion was coated on the above subbing layered polyethylene terephthalate support.

| | |
|---|---|
| Latex polymer: styrene-butylacrylate-acrylic acid terpolymer | 1.0 g/m² |
| Phenol | 1 mg/m² |
| Saponin | 200 mg/m² |
| Sodium dodecylbenzenesulfonate | 20 mg/m² |
| Tetrazolium compound | shown below |
| Compound (N) | 40 mg/m² |
| Compound (O) | 50 mg/m² |
| Styrene-maleic acid copolymer | 30 mg/m² |
| Alkali processed gelatin (isoelectric point 4.9) | 2.0 g/m² |
| Silver | 3.5 g/m² |
| Formalin | 10 mg/m² |
| Compound (N) | |

-continued

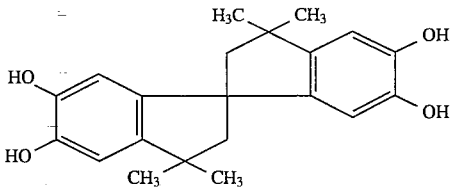

Compound (O)

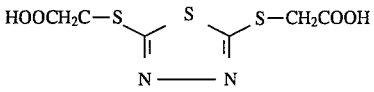

Tetrazolium compound T-2 50 mg/m²

The coating solution was coated after adjusting to pH 6.5 with sodium hydroxide.

The following emulsion protective layer was coated to have the following content simultaneously together with the emulsion.

| (Protective layer) | |
|---|---|
| Fluorinated dioctylsulfosuccinate | 100 mg/m² |
| Dioctylsulfosuccinate | 100 mg/m² |
| Matting agent: amorphous silica | 50 mg/m² |
| Compound (O) | 30 mg/m² |
| 5-methylbenzotriazole | 20 mg/m² |
| Compound (P) | 500 mg/m² |
| propyl gallate | 300 mg/m² |
| Styrene-maleic acid copolymer | 100 mg/m² |

-continued

| (Protective layer) | |
|---|---|
| Alkali processed gelatin (isoelectric point 4.9) | 1.0 g/m$^2$ |
| Formalin | 10 mg/m$^2$ |

The coating solution was coated after adjusting to pH 5.4 with citric acid.

Compound (P)

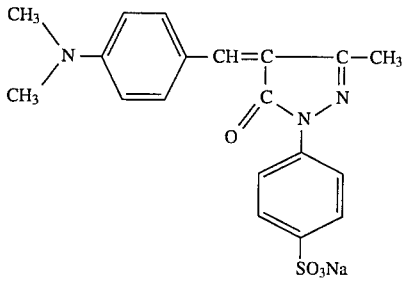

The backing layer was provided on the support side opposite the emulsion layer in the same manner as in Example 2 of Japanese Patent O.P.I. Publication No.2-226134.

Sample No. 1 obtained above was evaluated in the same manner as in Example 1, except that the following processing condition was carried out.

| (Processing condition) | | |
|---|---|---|
| Processing step | Temperature, °C. | Time, seconds |
| Developing | 35 | 15 |
| Fixing | 35 | 10 |
| Washing | room temp. | 10 |
| Drying | 45 | 7.5 |

The results are shown in Table 2.

TABLE 2

| Sample No. | Carbonate (mol/l) | Boric acid (mol/l) | K/Na ratio | Fresh solutions Sensitivity | Fresh solutions Gamma | Solutions after processing Sensitivity | Solutions after processing Gamma | Remarks |
|---|---|---|---|---|---|---|---|---|
| 1 | 0.15 | 0 | 0.1 | 100 | 10.5 | 89 | 10.4 | Comp. |
| 2 | 0.25 | 0 | 0.1 | 101 | 11.0 | 101 | 11.0 | Inv. |
| 3 | 0.4 | 0 | 0.1 | 101 | 11.0 | 101 | 11.0 | Inv. |
| 4 | 0.15 | $1.6 \times 10^{-2}$ | 0.1 | 100 | 10.4 | 88 | 9.8 | Comp. |
| 5 | 0.25 | $4.85 \times 10^{-2}$ | 0.1 | 102 | 11.0 | 100 | 11.0 | Inv. |
| 6 | 0.25 | 0 | 0.3 | 103 | 11.0 | 101 | 10.9 | Inv. |
| 7 | 0.25 | $4.85 \times 10^{-2}$ | 0.3 | 102 | 11.1 | 102 | 11.1 | Inv. |
| 8 | 0.4 | $3.2 \times 10^{-2}$ | 0.25 | 102 | 11.1 | 102 | 11.2 | Inv. |

As is apparent from Table 2, the invention shows the same less variation of photographic properties as Example 1.

Example 3

Samples were prepared in the same manner as in Example 1, except that the emulsion comprising silver halide grains having a silver chloride content as shown in Table 3 was used. The samples above obtained above were processed in the same manner as in Example 1, except that the developer shown in Table 3 was used and evaluated in the same manner as in Example 1. Further, black spots at unexposed portions of the developed samples was counted in terms of the number per $1\times10^2$ cm$^2$, using 10 power magnifier.

The results are shown in Table 3.

TABLE 3

| Sample No. | Silver chloride content (mol %) | Carbonate (mol/l) | Boric acid (mol/l) | K/Na ratio | Fresh solutions Sensitivity | Fresh solutions Gamma | Fresh solutions *P.F | Solutions after processing Sensitivity | Solutions after processing Gamma | Solutions after processing *P.F | Remarks |
|---|---|---|---|---|---|---|---|---|---|---|---|
| 1 | 85 | 0.25 | 0 | 0.1 | 96 | 11.5 | 4 | 87 | 10.4 | 38 | Comp. |
| 2 | 92 | 0.25 | 0 | 0.1 | 102 | 12.0 | 2 | 102 | 12.1 | 3 | Inv. |
| 3 | 85 | 0.25 | $4.85 \times 10^{-2}$ | 0.1 | 98 | 11.4 | 5 | 88 | 10.3 | 42 | Comp. |
| 4 | 92 | 0.25 | $4.85 \times 10^{-2}$ | 0.1 | 103 | 11.8 | 2 | 103 | 12.0 | 2 | Inv. |
| 5 | 85 | 0.25 | 0 | 0.3 | 97 | 11.5 | 6 | 90 | 10.0 | 54 | Comp. |
| 6 | 92 | 0.25 | 0 | 0.3 | 103 | 11.9 | 2 | 103 | 11.9 | 2 | Inv. |
| 7 | 85 | 0.25 | $4.85 \times 10^{-2}$ | 0.3 | 99 | 11.6 | 6 | 86 | 10.1 | 50 | Comp. |
| 8 | 92 | 0.25 | $4.85 \times 10^{-2}$ | 0.3 | 102 | 12.1 | 2 | 102 | 12.2 | 1 | Inv. |

P.F: black spots

Example 4

Samples were prepared in the same manner as in Example 2, except that the emulsion comprising silver halide grains having a silver chloride content as shown in Table 4 was used. The samples above obtained above were processed in the same manner as in Example 1, except that the developer shown in Table 4 was used and evaluated in the same manner as in Example 2. Further, fog of the samples was measured.

The results are shown in Table 4.

TABLE 4

| Sample No. | Silver chloride content (mol %) | Carbonate (mol/l) | Boric acid (mol/l) | K/Na ratio | Fresh solutions Sensitivity | Fresh solutions Gamma | Fresh solutions Fog | Solutions after processing Sensitivity | Solutions after processing Gamma | Solutions after processing Fog | Remarks |
|---|---|---|---|---|---|---|---|---|---|---|---|
| 1 | 80 | 0.25 | $4.85 \times 10^{-2}$ | 0.2 | 93 | 10.4 | 0.02 | 82 | 9.4 | 0.12 | Comp. |
| 2 | 86 | 0.25 | $4.85 \times 10^{-2}$ | 0.2 | 96 | 10.5 | 0.02 | 82 | 9.4 | 0.10 | Comp. |
| 3 | 92 | 0.25 | $4.85 \times 10^{-2}$ | 0.2 | 102 | 11.0 | 0.02 | 102 | 11.0 | 0.02 | Inv. |
| 4 | 96 | 0.25 | $4.85 \times 10^{-2}$ | 0.2 | 102 | 11.0 | 0.02 | 102 | 11.0 | 0.02 | Inv. |

What is claimed is:

1. A method of processing a silver halide photographic light-sensitive material comprising a support having provided thereon, a silver halide emulsion layer comprising silver halide grains having not less than 90 mol % chloride, said emulsion layer or a hydrophilic colloid layer provided adjacent to said emulsion layer containing a tetrazolium compound or a hydrazine derivative, with a developer, said developer containing a carbonate salt in an amount of not less than 0.2 mol/liter, a ratio of a potassium ion to a sodium ion in said developer being 0.2:1 to 10:1, said developer being replenished in an amount of not more than 200 ml/m$^2$ of material processed.

2. The method of claim 1 wherein said ratio of potassium ion to sodium ion in said developer is 0.5:1 to 2:1.

3. The method of claim 1, wherein said developer further contains not less than $1.6\times10^{-2}$ mol/liter of boric acid or a borate.

4. The method of claim 1, wherein said developer contains a carbonate salt in an amount of 0.2 to 1.0 mol/liter.

5. The method of claim 3, wherein said developer contains $1.6\times10^{-2}$ to $3.3\times10^{-1}$ mol/liter of boric acid or a borate.

6. The method of claim 1, wherein said hydrazine derivative is represented by Formula [H]

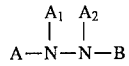

Formula [H]

wherein A represents a substituted or unsubstituted aliphatic, aryl or heterocyclic group; B represents an acyl group, an arylsulfonyl group, an alkylsulfinyl group, an arylsulfinyl group, a carbamoyl group, an alkoxycarbonyl group, an aryloxycarbonyl group, a sulfamoyl group, a sulfinamoyl group, an alkoxysulfonyl group, a thioacyl group, a thiocarbamoyl group, an oxalyl group or a heterocyclic group, provided that B may form $-N{=}C(R_9)(R_{10})$ together with $A_2$ and a nitrogen atom, wherein $R_9$ represents a substituted or unsubstituted, aryl or heterocyclic group and $R_{10}$ represents a hydrogen atom or a substituted or unsubstituted alkyl, aryl or heterocyclic group; and $A_1$ and $A_2$ both represent hydrogen atoms or one of $A_1$ and $A_2$ represents a hydrogen atom and the other represents an acyl group, a sulfonyl group or an oxalyl group.

7. The method of claim 1, wherein said hydrazine derivative is represented by Formula [Ha]

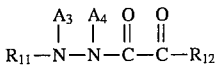

Formula [Ha]

wherein $R_{11}$ represents a substituted or unsubstituted aryl or heterocyclic group; $R_{12}$ represents

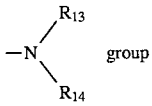

group and —$OR_{15}$ group wherein $R_{13}$ and $R_{14}$ independently represent a hydrogen atom, a substituted or unsubstituted alkyl, alkenyl, alkinyl, aryl or heterocyclic group, a substituted or unsubstituted alkoxy, alkenyloxy, alkinyloxy, aryloxy or heterocyclicoxy group, an amino group or a hydroxy group, provided that $R_{13}$ and $R_{14}$ may form a ring together with a nitrogen atom and $R_{15}$ represents a hydrogen atom or a substituted or unsubstituted alkyl, alkenyl, alkinyl, aryl or heterocyclic group; and $A_3$ and A4 both represent hydrogen atoms or one of $A_3$ and A4 represents a hydrogen atom and the other represents an acyl group, a sulfonyl group or an oxalyl group.

8. The method of claim 1, wherein said tetrazolium compound is represented by Formula [T]

Formula [T]

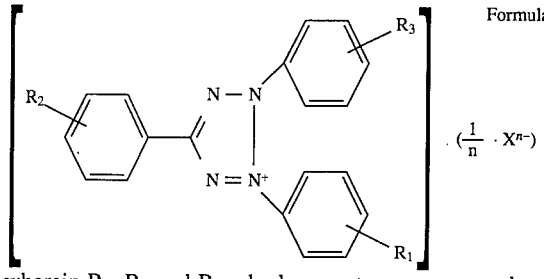

wherein $R_1$, $R_2$ and $R_3$ a hydrogen atom or a group having a negative or positive Hammett's sigma value (σP); n is represents 1 or 2; and $X^-$ represents an anion.

* * * * *